United States Patent
Adams et al.

(10) Patent No.: US 9,186,723 B2
(45) Date of Patent: Nov. 17, 2015

(54) METHOD OF PRODUCING METAL MATRIX COMPOSITE (MMC) WITH UNIFORM SURFACE LAYERS

(71) Applicants: Richard Adams, Bolton, MA (US); Sarly Pino, Pawtucket, RI (US)

(72) Inventors: Richard Adams, Bolton, MA (US); Sarly Pino, Pawtucket, RI (US)

(73) Assignee: CPS technologies Corp, Norton, MA (US)

( * ) Notice: Subject to any disclaimer, the term of this patent is extended or adjusted under 35 U.S.C. 154(b) by 0 days.

(21) Appl. No.: 14/120,702

(22) Filed: Jun. 18, 2014

(65) Prior Publication Data

US 2015/0096708 A1   Apr. 9, 2015

Related U.S. Application Data

(60) Provisional application No. 61/961,223, filed on Oct. 8, 2013.

(51) Int. Cl.
| | |
|---|---|
| *B22D 19/00* | (2006.01) |
| *B22D 19/02* | (2006.01) |
| *B32B 15/00* | (2006.01) |

(52) U.S. Cl.
CPC ............ *B22D 19/0081* (2013.01); *B22D 19/00* (2013.01); *B22D 19/02* (2013.01); *B32B 15/00* (2013.01); *B32B 2250/03* (2013.01); *B32B 2250/40* (2013.01); *B32B 2262/105* (2013.01); *B32B 2311/00* (2013.01)

(58) Field of Classification Search
CPC ...... B22D 17/00; B22D 17/002; B22D 17/22; B22D 19/00; B22D 19/02; B22D 19/04; B22D 19/14
See application file for complete search history.

(56) References Cited

U.S. PATENT DOCUMENTS

2012/0186427 A1*   7/2012   Adams et al. ................ 89/36.02

\* cited by examiner

*Primary Examiner* — Kevin P Kerns
*Assistant Examiner* — Steven Ha

(57) ABSTRACT

A method of producing a Metal Matrix Composite (MMC) with uniform surface layers is disclosed. First, a low volume fraction compressible discontinuous ceramic fiber paper is set on the base of a mold cavity. Next, an array of reinforcement preform(s) (1×1, 2×2, 4×4, 2×8, etc) are set in the mold on top of the ceramic fiber paper. A top layer of ceramic fiber paper is next placed on the array of reinforcement preforms and the mold cover seals the mold. The reinforcement porous preform(s) are held to the center of the mold cavity when the sealed mold compresses the top and bottom layers of ceramic fiber paper. The ceramic fiber paper exerts an equal and opposite force on the reinforcement preform(s) within the closed mold centering the preform(s) within the mold cavity. The mold cavity is next infiltrated under pressure with molten metal allowing for metal to penetrate into any open porosity of the ceramic fiber paper, reinforcement preform(s), and areas within the mold cavity that contain open spaces. Subsequent to molten metal infiltration, the aluminum rich surface layers are equal thickness on both sides of the reinforcement preform(s).

17 Claims, 2 Drawing Sheets

METHOD OF PRODUCING METAL MATRIX COMPOSITE (MMC) WITH UNIFORM SURFACE LAYERS

CROSS-REFERENCE TO RELATED APPLICATIONS

This application claims the benefit of U.S. Provisional Application No. 61/961,223 filed 8 Oct. 2013.

FIELD OF THE INVENTION

This invention relates to a method of controlling the aluminum surface layer thickness of a Metal Matrix Composite (MMC).

BACKGROUND OF THE INVENTION

Metal matrix composites have excellent tensile strength and stiffness. Some Metal matrix composites (MMCs) are made by placing a porous ceramic preform into a mold cavity and infiltrating with aluminum. In order to assure that the mold will close, the preform dimensions, including tolerances, must be less than the mold cavity depth. Therefore, there will always be gaps between the preform and mold surfaces. These gaps will fill with aluminum and form aluminum rich layers at the surface. Where the surfaces of the MMC are aluminum rich the resulting metal matrix composite is not homogenous throughout its thickness.

Also, the location of the porous preform is not fixed within the mold cavity, so the aluminum rich surface layer may be different on one side than the other. In the worst case, the aluminum rich surface layer may be almost zero thickness on one side and thick on the other side. It is desired that the porous preform be held to the center of the cavity, so that the aluminum rich surface layers are equal thickness on both sides of the preform.

It is an object of the present invention to utilize a low volume fraction compressible ceramic fiber paper on the top and bottom layers of the preform used to make a Metal Matrix Composite (MMC) to ensure a consistent uniform layer of encapsulating aluminum without the need for exacting standards in preform dimensions.

It is a further object of the present invention to utilize a low volume fraction compressible ceramic fiber paper on the top and bottom layers of the preform used to make a Metal Matrix Composite (MMC) to exert an equal and balanced force on both sides of the preform to center the preform within the mold cavity prior to metal infiltration.

SUMMARY OF THE INVENTION

First, a low volume fraction compressible discontinuous ceramic fiber paper is set on the base of a mold cavity. Next, any array of preforms (1×1, 2×2, 4×4, 2×8, etc) are set in the mold on top of the ceramic fiber paper. A top layer of ceramic fiber paper is next placed on the array of preforms and the mold cover seals the mold. The mold cavity is next infiltrated under pressure with molten metal allowing for metal to penetrate into any open porosity of the ceramic fiber paper, ceramic preforms, and areas within the mold cavity that contain open spaces. The molten metal then encapsulates the preform into an integrated MMC, transforming the preform layers into reinforcement layers. Prior to molten metal infiltration, the porous preform is held to the center of the mold cavity when the sealed mold compresses the top and bottom layers of ceramic fiber paper. Subsequent to molten metal infiltration, the aluminum rich surface layers are equal thickness on both sides of the reinforcement provided by the preform at the core and resulting in uniform thickness reinforcement layer(s) due to the compression of the ceramic paper forcing the preform to the center of the mold cavity.

The mold chamber is fabricated to create the final shape or closely approximate that desired of the final product. The MMC is next demolded and comprises a hybrid structure of metal matrix composite with an aluminum rich skin embodied in the ceramic fiber paper.

The preform layers can include an infinite combination of material types and geometries, and there may be more than one stacked layer of preforms, each layer having at least one preform, or an array of preforms (1×1, 2×2, 4×4, 2×8, etc).

These layers may comprise inorganic material systems such as ceramics, metals, carbon/graphite materials, or composites with dense or porous microstructures. The geometries can be in the form of flat plates of varying thickness, compound curved shapes, spheres, cylinders, and of multiple sequences and combinations of materials.

A selection of different material types throughout the layup allows the designer to vary thermal expansion coefficients throughout the structure to create varying stress states for increased effectiveness if desired. The selection of different material types may also be based on hardness, strength, toughness, and weight attributes of the individual material types.

BRIEF DESCRIPTION OF THE DRAWINGS

The invention is best understood from the following detailed description when read in connection with the accompanying drawings, which illustrate an embodiment of the present invention.

DETAILED DESCRIPTION OF THE INVENTION

Figure 1:
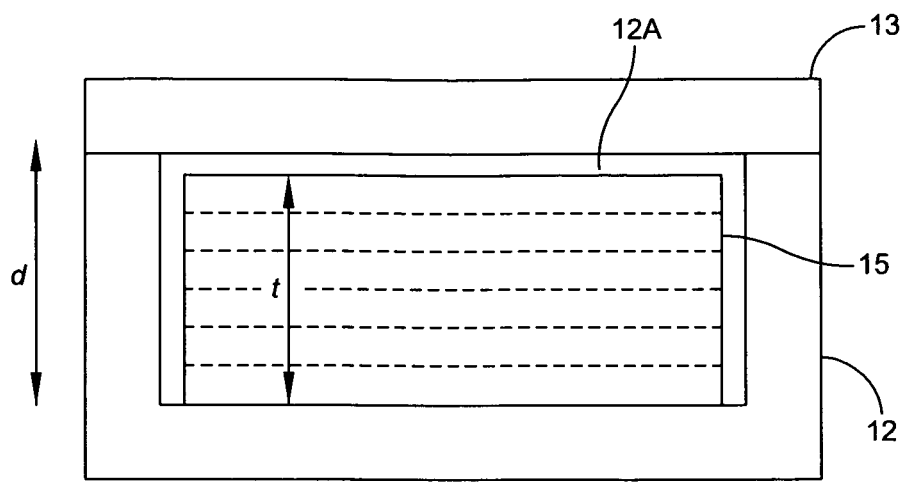
FIG. 1 is a cross section of a mold cavity 12 utilized in the present invention with a reinforcement layer placed therein.
Figure 2:
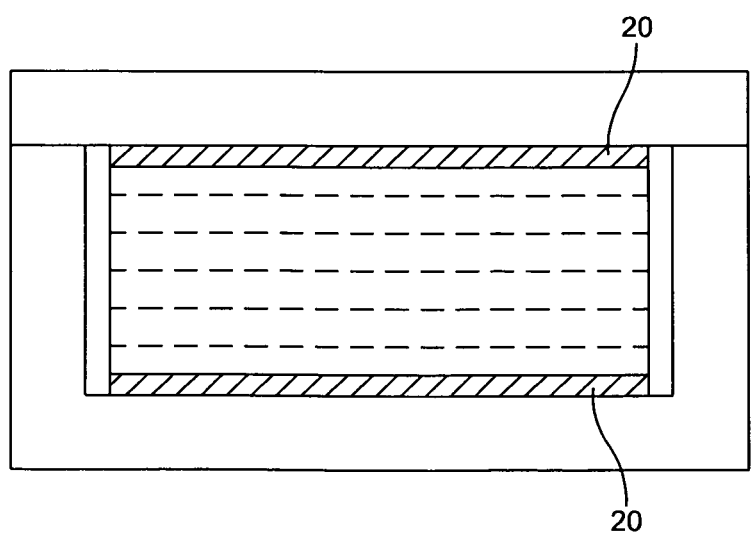
FIG. 2 illustrates the mold cavity 12 of FIG. 1, prior to metal infiltration, utilizing a ceramic fiber paper as the top and bottom layers 20.
Figure 3:
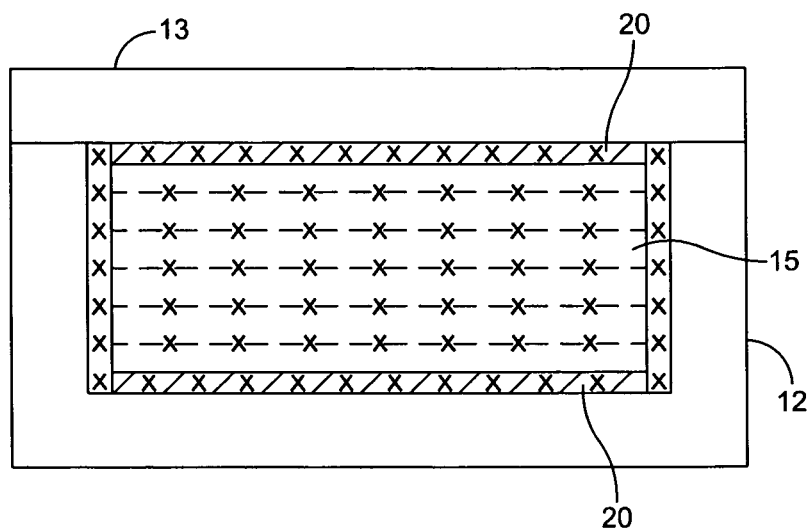
FIG. 3 illustrates the mold cavity 12 of FIG. 2 subsequent to metal infiltration, illustrating the resulting reinforcement layer 15.

Referring to FIG. 1 and FIG. 2 at least one preform layer(s) 15 are placed into a mold cavity 12 suitable for molten metal infiltration casting. As illustrated in FIG. 3, at least one preform layer(s) 15 are transformed into at least one reinforcement layer(s) 15 after molten metal infiltration. The reinforcement mold cavity is typically prepared from a graphite die suitable for molten metal infiltration casting with the dimensions defined to produce a multi-structure metal matrix composite. A lid 13 defines the mold cavity 12 dimensions prior to infiltration casting. Referring to FIG. 1, at least one preform layer 15 is placed within the mold cavity. It should be understood that although only one preform layer reinforcement layer 15 is illustrated, the preform layers can include an infinite combination of material types and geometries, and there may be more than one stacked layer of preform layers, each layer having at least one preform, or an array of preforms (1×1, 2×2, 4×4, 2×8, etc).

These layers 15 may comprise inorganic material systems such as ceramics, metals, carbon/graphite materials, or composites with dense or porous microstructures. The geometries can be in the form of flat plates of varying thickness, compound curved shapes, spheres, cylinders, and of multiple sequences and combinations of materials.

As illustrated in FIG. 1, a gap 12A can exist between the mold cavity cover inner surface and preform layer(s) 15 top surface. The side surfaces of the preform layer may also contain a gap, and the method of the present invention could apply to horizontal alignment of the preform layer in the center of the mold. However, in the preferred embodiment, the objective of the present invention is to center the preform vertically to achieve uniform top and bottom surface layers. As illustrated in FIG. 1, after preform layer 15 is placed in the mold there may exist a space 12A on the top of layer 15 but not on the bottom since the layer 15 rests on the mold cavity base. As illustrated in FIG. 2, to fill this gap on the top of preform layer(s) 15, a low volume fraction discontinuous ceramic fiber paper 20 is placed on the top of reinforcement layer(s) 15. Ceramic fiber paper 20 is also placed on the bottom of preform layer(s) 20 to sandwich the layer 15 between the two layers of ceramic fiber paper 20.

In the preferred embodiment, ceramic fiber paper 20 manufactured by Unifrax LLC, Niagra Falls, N.Y. is utilized. When lid 13 seals the mold cavity the lid compresses fiber paper 20 on both the top and bottom of Preform layer(s) 15. The compression properties of the fiber paper 20 forces preform layer 15 to the center of the mold cavity.

Ceramic fiber paper 20 from about 0.005 inches to about 0.015 inches may be utilized in the present invention. In one embodiment, Ceramic fiber paper 20 of a thickness of about 0.013 inches has shown through experimentation to compress down to 0.006 inches under a constant compression. After being compressed the fiber paper 20 exerts an equal and balanced force on both sides of the preform layer(s) 15 to center the layers 15 within the mold cavity. A compression of between about 10% to about 90% of the fiber paper 20 could be utilized to achieve the centering properties. It is further understood that the compressibility of the fiber paper 20 is unchanged even under high temperature thermal conditions exceeding 600 degrees Celcius.

It is therefore possible to obtain a total range of compression of about 0.007 inches for each ceramic fiber paper layer 20, or a total compression of 0.014 inches. Where layer(s) 15 thickness (t) is too thin or to thick and mold cavity 12 depth (d) is to deep or to shallow a margin of error of 0.014 in (t+d) is tolerable and would result in a centered layer(s) 15.

In another embodiment, Ceramic fiber paper 20 of a thickness of 0.013 inches is compressed down to 0.009 inches. In the case where the sealed mold cavity depth (d) is strictly dimensioned at 0.150 inches, and accounting for the 0.009 inches in used mold depth (d) the preferred preform thickness PPT=0.150−(2*0.009)=0.132 inches. Under these conditions the variability of the PPT (PPT+/−0.007 inches) could be anywhere between about 0.125 inches to about 0.139 inches due to the 0.007 reserve compression availability.

Similarly, if the layer(s) 15 thickness (t) is held constant at 0.132 inches the variability in the mold cavity depth d (d+/−0.007 inches) would range from about 0.143 to about 0.158 inches, due to the 0.007 reserve compression availability.

In both cases the compression characteristics of the ceramic paper 20 allow for imprecise dimensions in either mold cavity depth or preform width, by exerting equal and balanced force on both sides of the preform layer(s) 15 and thereby centering the preform within the mold cavity. Utilizing multiple layers of paper 20 would allow a greater compression if required to alleviate a larger gap thickness between a mold and preform layer 15.

The centered preform layer(s) 15 is next infiltrated with molten aluminum, creating a reinforcement layer(s) 15, and forming a metal matrix composite in the desired product shape geometry.

Referring to FIG. 3, any open voids within the preform layers are filled with aluminum during the Al infiltration process, creating metal infiltrated metal matrix composite, where the aluminum is denoted as "X". Metal infiltrated layer 20 creates a uniform surface layer of aluminum and prevents distortion due to asymmetric shrinking forces. The centered Ceramic fiber paper Layers 20, being compressible, create equally sized layers 20 that are infiltrated with aluminum forming uniform surface layers. A low volume fraction between about 1% to about 6% by volume of small diameter fibers of ceramic fiber paper 20, creates an aluminum skin that can be plated through chemical plating methods known in the art.

The aluminum infiltration process causes aluminum to penetrate throughout the overall structure and solidifies within the material layers of open porosity, extending from one layer to the next, thus binding the layers together and integrating the structure. While molten aluminum is the embodiment illustrated other suitable metals include but are not limited to aluminum alloys, copper, titanium and magnesium, and other metal alloys cast from the molten liquid phase. The liquid metal infiltration process is described in U.S. Pat. No. 3,547,180 and incorporated herein by reference for all that it discloses. The metal matrix composite containing the insert is next demolded or removed from the closed mold.

It should be understood that the preceding is merely a detailed description of one embodiment of this invention and that numerous changes to the disclosed embodiment can be made in accordance with the disclosure herein without departing from the spirit or scope of the invention. Rather, the scope of the invention is to be determined only by the appended claims and their equivalents.

We claim:

1. A method of making a Metal Matrix Composite with uniform surface layers, comprising the steps of:
   placing at least one first ceramic fiber paper layer(s) on the base of a mold;
   placing at least one preform layer(s) over said at least one first ceramic fiber paper layer(s);
   placing at least one second ceramic fiber paper layer(s) on the top of said at least one preform layer(s), wherein said at least one first ceramic fiber paper layer(s) and said at least one second ceramic fiber paper layer(s) comprise between about 1% to about 6% ceramic fiber content;
   compressing said at least one first ceramic fiber paper layer(s) and said at least one second ceramic fiber paper layer(s) against said at least one preform layer(s) within said mold; and
   centering said at least one preform layer(s) within said mold cavity, said centering step further including the step of said compressed at least one first ceramic fiber paper layer(s) and said compressed at least one second ceramic fiber paper layer(s) exerting an equal and opposite force on said at least one preform layer(s) within said mold whereby said at least one preform layer(s) are centered within said mold cavity.

2. The method of claim 1 further including the step of:
   infiltrating said mold under pressure with a liquid metal such that said at least one first ceramic fiber paper layer(s), said at least one second ceramic fiber paper layer(s), and said at least one preform layer(s) are infiltrated with said metal, said metal binding said plurality of layers together to form a metal matrix composite conforming to the shape of said closed mold chamber.

3. The method of claim 1, wherein said at least one first ceramic fiber paper layer(s) and said at least one second ceramic fiber paper layer(s) are each from about 5 to about 15 thousandths of an inch in thickness.

4. The method of claim 2, wherein said at least one preform layer(s) has a fraction of void volume to be infiltrated with said liquid metal.

5. The method of claim 2, wherein said at least one first ceramic fiber paper layer(s) and said at least one second ceramic fiber paper layer(s) have a fraction of void volume to be infiltrated with said liquid metal.

6. The method of claim 1, wherein said mold is selected according to the desired shape of said metal matrix composite.

7. The method of claim 1, wherein said liquid metal is selected from the group of alloys consisting of aluminum, copper, titanium, and magnesium.

8. The method of claim 1, wherein said compressing step is accomplished with a lid exerting force downward against said at least one second ceramic fiber paper layer(s), at least one preform layer(s), and at least one first ceramic fiber paper layer(s).

9. The method of claim 8, wherein said compressing step further includes the step of securing said lid in a position to exert said downward force.

10. The method of claim 3, wherein said thickness of said at least one first ceramic fiber paper layer(s) and said at least one second ceramic fiber paper layer(s) are compressed between from about 10% to about 90% of said thicknesses.

11. The method of claim 1, wherein said at least one first ceramic fiber paper layer(s) and said at least one second ceramic fiber paper layer(s) have equal thicknesses following said centering step.

12. The method of claim 1, wherein said at least one preform layer further comprises at least one preform selected from the group consisting of ceramics, metals, and carbon/graphite materials.

13. The method of claim 12, wherein said preforms comprise dense or porous microstructures.

14. The method of claim 12 wherein said preforms comprise geometries in the form of flat plates of varying thickness, compound curved shapes, spheres, and cylinders.

15. A method of making a Metal Matrix Composite with uniform surface layers, comprising the steps of:
   placing at least one first ceramic fiber paper layer(s) on the base of a mold;
   placing at least one preform layer(s) over said at least one first ceramic fiber paper layer(s);
   placing at least one second ceramic fiber paper layer(s) on the top of said at least one preform layer(s), wherein said at least one first ceramic fiber paper layer(s) and said at least one second ceramic fiber paper layer(s) are each from about 5 to about 15 thousandths of an inch in thickness, wherein said thickness of said at least one first ceramic fiber paper layer(s) and said at least one second ceramic fiber paper layer(s) are compressed between from about 10% to about 90% of said thicknesses;
   compressing said at least one first ceramic fiber paper layer(s) and said at least one second ceramic fiber paper layer(s) against said at least one preform layer(s) within said mold;
   centering said at least one preform layer(s) within said mold cavity, said centering step further including the step of said compressed at least one first ceramic fiber paper layer(s) and said compressed at least one second ceramic fiber paper layer(s) exerting an equal and opposite force on said at least one preform layer(s) within said mold whereby said at least one preform layer(s) are centered within said mold cavity.

16. The method of claim 15 further including the step of:
   infiltrating said mold under pressure with a liquid metal such that said at least one first ceramic fiber paper layer(s), said at least one second ceramic fiber paper layer(s), and said at least one preform layer(s) are infiltrated with said metal, said metal binding said plurality of layers together to form a metal matrix composite conforming to the shape of said mold chamber.

17. A method of making a Metal Matrix Composite with uniform surface layers, comprising the steps of:
   placing at least one first ceramic fiber paper layer(s) on the base of a mold;
   placing at least one preform layer(s) over said at least one first ceramic fiber paper layer(s);
   placing at least one second ceramic fiber paper layer(s) on the top of said at least one preform layer(s);
   wherein said at least one first ceramic fiber paper layer(s) and said at least one second ceramic fiber paper layer(s) are each about 5 to about 15 thousandths of an inch in thickness;
   compressing said at least one first ceramic fiber paper layer(s) and said at least one second ceramic fiber paper layer(s) against said at least one preform layer(s) within said mold, wherein said thickness of said at least one first ceramic fiber paper layer(s) and said at least one second ceramic fiber paper layer(s) are compressed between from about 10% to about 90% of said thicknesses; and
   centering said at least one preform layer(s) within said mold cavity, said centering step further including the step of said compressed at least one first ceramic fiber paper layer(s) and said compressed at least one second ceramic fiber paper layer(s) exerting an equal and opposite force on said at least one preform layer(s) within said mold whereby said at least one preform layer(s) are centered within said mold cavity, wherein said thickness of said at least one first ceramic fiber paper layer(s) and said at least one second ceramic fiber paper layer(s) are equal following said centering step.

* * * * *